United States Patent
Lin et al.

(10) Patent No.: US 6,778,875 B2
(45) Date of Patent: Aug. 17, 2004

(54) NOISE FILTER FOR BACKSIDE HELIUM SIGNAL

(75) Inventors: Mu-Tsang Lin, Changhua (TW); Zhih-Lu Juang, Shinjuang (TW); Tung-Mao Lee, Kaosiung (TW)

(73) Assignee: Taiwan Semiconductor Manufacturing Co., Ltd, Hsin Chu (TW)

( * ) Notice: Subject to any disclaimer, the term of this patent is extended or adjusted under 35 U.S.C. 154(b) by 178 days.

(21) Appl. No.: 10/224,754

(22) Filed: Aug. 21, 2002

(65) Prior Publication Data

US 2004/0039471 A1 Feb. 26, 2004

(51) Int. Cl.[7] .............................................. G06F 19/00

(52) U.S. Cl. ....................... 700/121; 438/714; 209/235

(58) Field of Search ........................... 700/121, 21, 110, 700/96, 204, 80; 438/714, 719, 721; 209/235, 643; 118/719

(56) References Cited

U.S. PATENT DOCUMENTS

| | | | | |
|---|---|---|---|---|
| 5,624,582 A | * | 4/1997 | Cain | 438/715 |
| 5,753,566 A | * | 5/1998 | Hwang | 438/715 |
| 5,968,278 A | * | 10/1999 | Young et al. | 134/1.1 |
| 6,254,398 B1 | * | 7/2001 | Chen | 439/9 |
| 6,424,880 B1 | * | 7/2002 | Goder et al. | 700/121 |

* cited by examiner

Primary Examiner—Leo Picard
Assistant Examiner—Kidest Bahta
(74) Attorney, Agent, or Firm—Tung & Associates

(57) ABSTRACT

A system using backside helium in the processing of wafers in the manufacturing of semiconductor products can cause alarms that can interrupt the manufacturing of the wafers and create damaged wafers. A PID controller responds to the flow of helium gas to generate control signals for operating several algorithms. A filter connected to the output of the PID controller removes unwanted and dangerous noise spikes that have in the past caused a condition called backside alarm. Noise spikes on the dc voltages, the helium supply pressure, the pressure set point, the pressure reading and the non-optimization of the PID controller can cause the alarm.

5 Claims, 2 Drawing Sheets

NOISE FILTER FOR BACKSIDE HELIUM SIGNAL

FIELD OF THE INVENTION

The present invention relates to processing of semiconductor wafers in general and more particularly to the elimination of false processing errors due to erratic noise in the PID control of backside helium.

BACKGROUND OF THE INVENTION

Backside cooling by helium controls the rate and uniformity of etching in a dry non-isotropic etching process of thermal silicon layers. Helium pressures are found in the two to twenty Torr range.

U.S. Pat. No. 5,624,582 issued to Cain teaches in a dry non-isotropic etching employing wafer backside cooling by means of helium gas flow to the backside of the wafer holder wherein the helium gas pressure is greater than about three Torr. The control system that controls the processing has many sensors including a sensing control for the flow of the helium. As with any alarm system, most of the alarms can initiate a process stoppage that in a great many instants ruins the wafer being processed.

U.S. Pat. No. 5,753,566 issued to Hwang, teaches the use of heated helium that is heated to a temperature between about 70° C. and about 100° C. This gas is circulated to the back surface of the work-piece to bow the work-piece forming a vaulted space there below. The pressure of the helium is between about 200 milliTorr and about 600 milliTorr above the work-piece and the pressure in the vaulted space below the work-piece is between eight and fourteen Torr. The use of helium as a cooling gas is to prevent the wafer from overheating.

U.S. Pat. No. 5,968,278 issued to Young et al. teaches an improved etching procedure that uses three processing steps to vastly improve the High Aspect Ratio "HAR", the high depth to width ratio, opening profile and improved underlayer selectivity. In each of the three processes backside helium is used for cooling and is in the pressure range between ten and fourteen milliTorr.

U.S. Pat. No. 6,254,398 issued to Chen, teaches a process having a two-cycle, dry etching procedure. The first cycle performs using a first set of dry etching conditions, not robust enough to result in etching of exposed material, but robust enough to allow the activation, and operation, of a backside helium alarm procedure. The backside helium alarm procedure is used to monitor particle count in the dry etching chamber. If the particle counts observed via use of the backside helium alarm procedure during the non-etching, first cycle are high, the dry etching procedure is interrupted. After cleanup of the dry etching chamber, the same samples, with a re-worked photoresist, are again subjected to the two-cycle, dry etching procedure.

SUMMARY OF THE INVENTION

In Automatic Pressure Control (APC) of Super Etching (Super-E) backside helium, the APC has a high-speed response for helium supply pressure or pumping speed change. So if the Proportional-Integral-Derivative (PID) control unit in the APC does not optimize or if the DC power supply has noise, the helium flow reading will have a spike noise appear. When the spike noise helium flow has been detected by the system during the process, the system will trigger an alarm to abort the process. This alarm is known as the "B/S helium alarm". In addition this alarm has serious problems around Super-E high RF power and high magnet process design environment.

These and other problems are readily solved by a special T-type R/C filter design in a semiconductor wafer-processing controller having a plurality of voltage inputs for receiving various regulated dc voltages to operate the controller. A helium gas input operatively connected to a source of helium gas and a helium gas output operatively connected to a wafer-processing chamber.

PID helium pressure controller is operatively connected to at least two of the voltage inputs and operates to control the flow of helium gas from the source to the helium gas output. The PID controller is responsive to the flow for generating a helium flow pulsed signal. A filter is responsive to the helium flow pulsed signal from the PID controller for reducing the amplitude of the pulsed signal when the pulsed signal has a duration less than a predetermined value and non-responsive to all other pulsed signals. The output of the filter is a filtered helium flow signal.

An alarm control unit is operatively responsive to the filtered helium flow signal for generating an alarm signal when the flow of helium gas has at least one measurable transient pulse signal greater than a first amplitude and with a time period between the predetermined value and a second value, the alarm signal is adaptable to interrupt the wafer fabricating process.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

Figure 1:
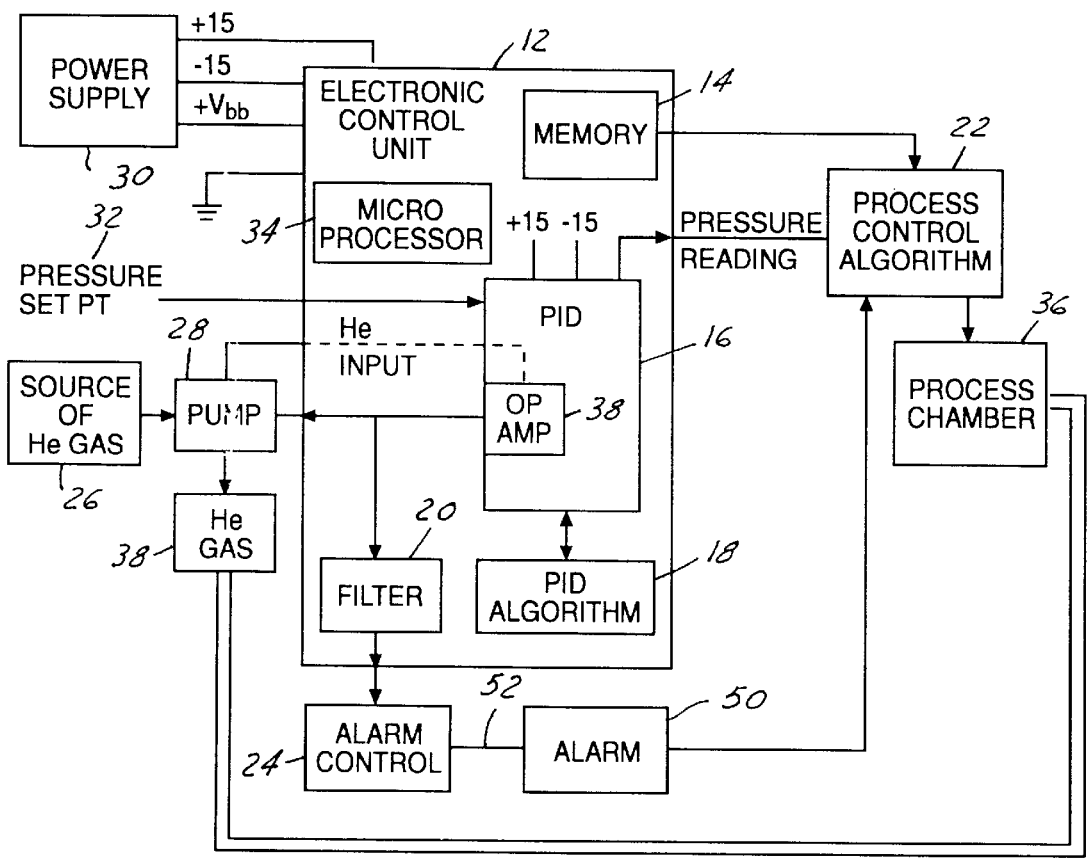
FIG. 1, is a block diagram of a helium pressure controller as found in an automatic pressure control system.

Referring to the FIGURES by the characters of reference, there is shown in FIG. 1 a block diagram of a helium pressure controller 10 that may be found in an automatic pressure controller system as used in a semiconductor wafer processing system. There is an electronic control unit, "ECU" 12 having a memory 14; a Proportional-Integral-Derivative controller, "PID" 16; a PID algorithm 18 stored in the memory 14; and the filter 20 of the present invention.

Connected to or controlled by the ECU 12 are a process control algorithm 22, an alarm controller 24, a source of helium gas, 26, and a pump 28. A power supply 30 supplies a plurality of voltages to the ECU 12. A pressure set-point control 32 is an input to the PID controller 16.

The ECU 12 has a microprocessor 34 including a memory 14 for storing and accessing several algorithms 18, 22 for controlling the processing in a process chamber 36. The power supply 30 supplies a plurality of regulated dc voltages to operate the ECU 12 in general and the PID controller 16 in particular. A source of helium gas 26 is used to provide the backside helium gas that is used in the process chamber 36 to maintain the temperature on the wafers as shown in U.S. Pat. No. 5,753,566 issued to Hwang on May 19, 1998 and assigned to a common assignee. The hot backside helium instead of room temperature helium (which is not used to remove the heat of the wafer) is used to provide heat to the work-piece and to preserve the heat of the work-piece at a certain level that is critical for uniformity during an etchback (EB) process for a spin-on-glass (SOG) layer. The hot backside helium protects the lower electrode, now shown, in the process chamber 36 from damage by the etching process. The entirety of this U.S. Pat. No. 5,753,566, is incorporated herein by reference.

The pump 28 is operatively connected to the source of helium gas 26 and is operated under control of the ECU 12. A sensor, not shown, is connected to the pump 28 for indicating the flow of the helium through the pump. The pump 28 supplies the helium gas at its output that is operatively connected to a wafer-processing chamber 36 for operating as illustrated in U.S. Pat. No. 5,753,566.

Figure 2:
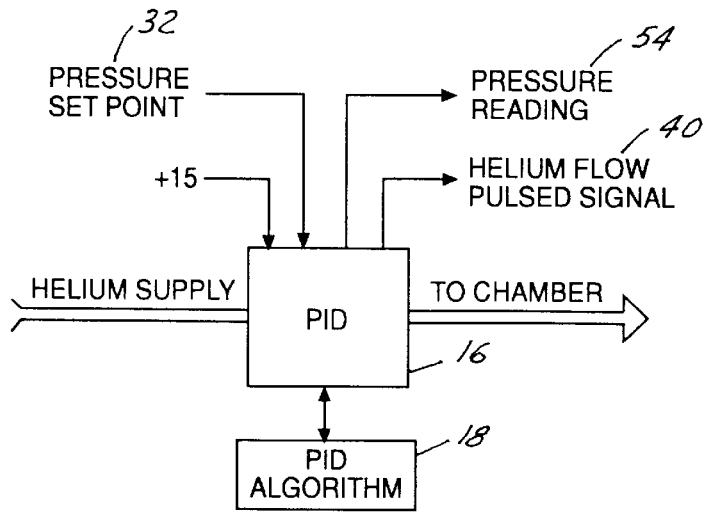
FIG. 2 is a block diagram schematic of the PID of the controller of FIG. 1.
Figure 3:
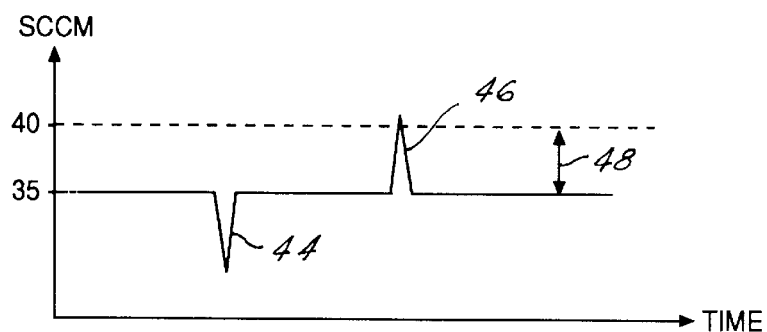
FIG. 3, is a waveform of typical spike measured in sccm vs. time.

Located within the ECU 12 is a PID helium pressure controller 16. The PID controller 16 is operatively connected to at least two of the voltage inputs, +15 volts and −15 volts and is operative for controlling the flow of the helium gas 38 from the pump 28. As illustrated in FIG. 2, the PID controller 16 is a control module in the ECU 12 responsive to the flow of helium from the source of helium gas 26 to the helium gas input to the process chamber 36. The PID controller 16 responds to the PID algorithm 18 and to the sensor output from the pump 28 to generate a helium flow reading. The output of the PID controller 16 is an OP amp 38 that is responsive to the flow of helium gas 38 for generating a helium flow pulsed signal 40. The helium flow pulsed signal 40 is operatively connected to the pump 28 causing the pump to operate. The output of the OP amp 38 is connected to the filter 20 that is responsive to the helium flow pulsed signal 40. As illustrated in FIG. 3, the output of the OP amp 38 is a spiked signal 42 that responds to any change in the in the pulsed output signal 40 or to any noise that is caused in the system by RF magnet turn, poor system or component grounding. These will trigger signal spiking on the helium flow pulsed signal 40. Of concern, as illustrated in FIG. 3 are spikes 44, 46 that are approximately 100 ms in width and have an amplitude that exceeds a threshold 48 that is 5 standard cubic centimeters/minute, "sccm". If the spikes 44, 46 are substantially longer in time, such as a spike from an amplitude found at the beginning of a pulse control signal, the filter 12 does not act these upon.

Therefore the filter 12 reduces the amplitude, the sccm height, of the pulsed signal that has a time duration less than a predetermined time value and is non-responsive to all other pulsed signals.

The output of the filter 12 is applied to the alarm control unit 24 that is responsive to the filtered helium flow signal for generating an alarm signal 52 when the flow of helium gas 38 has at least one measurable transient pulse signal greater than a first amplitude 48 and with a time period greater that the predetermined value and less than a much longer second value. One function of the alarm signal 52 is to apply to the process control algorithm 22 and is adaptable to interrupt the wafer fabricating process.

This alarm signal 52 is identified as a "Back-Side helium" alarm signal. Other conditions that can generate the back-side helium alarm signal 52 are noise on the regulated voltages that are applied to the PID controller 16. Another is a deviation in the helium supply pressure. Still others are noise on the pressure set point 32, the pressure reading 54, or the PID controller 16 not being optimized. All of these have as a result a helium flow reading spike 44, 46. If the spike 44, 46 can be filtered out 56, 58 as shown in FIG. 4, the system will be more robust and the instances of potential wafer damage will decrease significantly.

Figure 4:
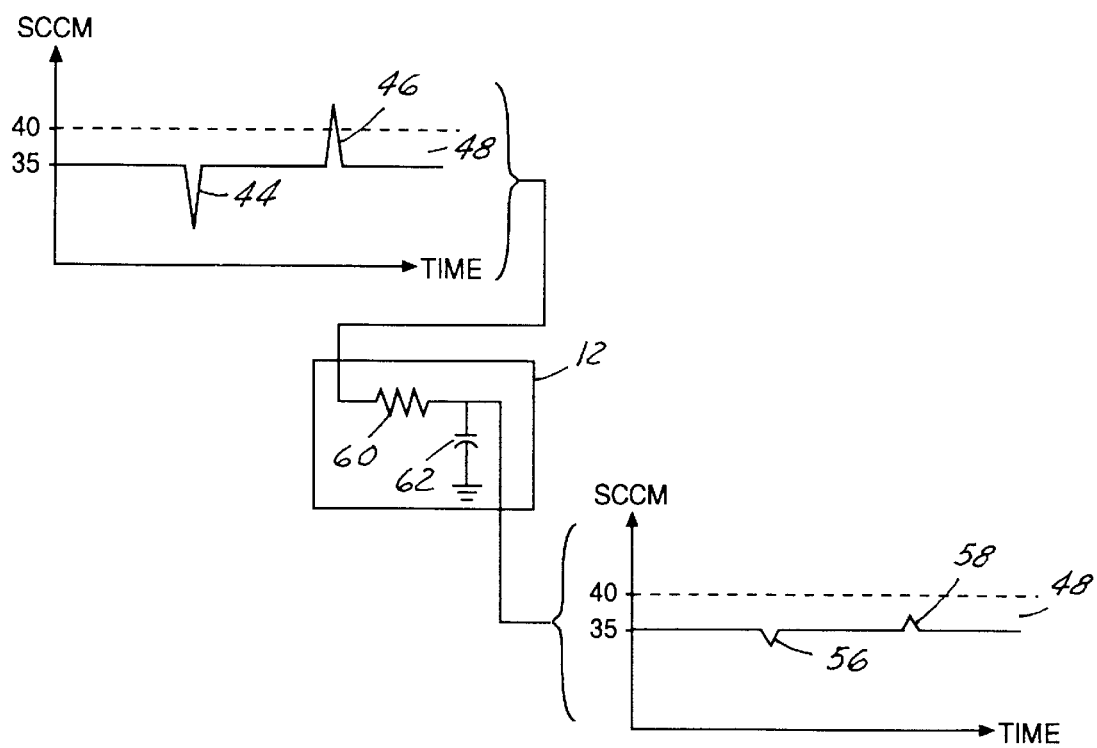
FIG. 4 is a black schematic of the effect of the present embodiment filter device on the waveform of FIG. 3.

As illustrated in FIG. 4 the filter 12 is an R-C filter having an in-circuit or series resistor 60 and a shunting capacitor 62 to ground. The value of the resistor 60 in the preferred embodiment is 10K and the value of the shunting capacitor 62 is twenty-two microfarads. These values are suitable for 100 milliseconds/5 sccm of noise and can filter noise up to 500 milliseconds/5 sccm.

Other changes in the system to reduce noise and "false" back/side helium alarm signals include the installation of magnetic resistors in the appropriate places in the control circuit; enhance the grounding of the control circuits by adding grounding cable; and isolate the signals by the use of faraday shields.

The PID controller 16 has an adjustable pressure set point responsive to the pressure set point signal 32. As previously stated it has a bias voltage input, +15, −15 from the plurality of voltage inputs to the ECU 12. It has a helium pressure output signal 54 and a helium flow pulsed output signal 40 that are connected to the filter 12.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

Accordingly, various changes and modifications may be made to the illustrative embodiment without departing from the spirit or scope of the invention. It is intended that the scope of the invention not be limited in any way to the illustrative embodiment shown and described but that the invention be limited only by claims appended hereto. The embodiment of the invention in which an exclusive property or privilege is claimed are defined as follows.

What is claimed is:

1. A semiconductor wafer-processing controller comprising:
    a plurality of voltage inputs for receiving various regulated dc voltages to operate the controller;
    a source of gas;
    a gas input operatively connected to said source of helium gas;
    a gas output operatively connected to a wafer-processing chamber;
    a PID gas pressure controller operative connected to at least two of said voltage inputs and operative to control the flow of gas from said source to said gas output and responsive to said flow for generating a gas flow pulsed signal;
    a filter responsive to said gas flow pulsed signal for reducing the amplitude of said pulsed signal having a duration less than a predetermine value and non-responsive to all other pulsed signals;
    applied to said alarm control, the output of said filter is a filtered gas flow signal; and
    an alarm control unit responsive to said filtered gas flow signal for generating an alarm signal when the flow of gas has at least one measurable transient pulse signal greater than a first amplitude and with a time period between said predetermined value and second value, said alarm signal adaptable to interrupt the wafer fabricating process.

2. The controller according to claim 1 wherein said filter is a Resistor-Capacitor filter.

3. The controller according to claim 2 wherein said filter decays noise spikes on said gas flow pulsed output signal having an amplitude greater than five standard cubic centimeters per minute (sccm) and a time period less than 100 ms in duration.

4. The controller according to claim 1 wherein said PID controller comprises:

an adjustable pressure set point;

a bias voltage input from said plurality of voltage inputs;

a gas pressure output signal; and a gas flow pulsed output signal.

5. The controller according to claim 4 wherein said gas flow pulsed output signal is connected to said filter by a shielded cable.

* * * * *